United States Patent

Granger

[15] 3,670,547
[45] June 20, 1972

[54] APPARATUS ADAPTED TO FORM COLLARS AROUND OPENINGS PREVIOUSLY EXECUTED IN PLATES OR TUBES

[72] Inventor: Maurice Granger, 9, rue Bourgneuf, Saint-Etienne, Loire, France

[22] Filed: June 24, 1969

[21] Appl. No.: 835,972

[30] Foreign Application Priority Data

June 28, 1968 France.....................................68137
Aug. 13, 1968 France.....................................68178
June 2, 1969 France....................................6917652

[52] U.S. Cl......................................72/75, 72/123, 72/454
[51] Int. Cl..........................................................B21d 19/00
[58] Field of Search..............72/75, 71, 123, 125, 126, 267, 72/270, 393, 399, 454

[56] References Cited

UNITED STATES PATENTS

| | | | |
|---|---|---|---|
| 236,285 | 1/1881 | Wilbur | 72/125 |
| 568,574 | 9/1896 | Hoyer | 72/75 |
| 1,794,797 | 3/1931 | Rockwell | 72/75 |
| 2,190,386 | 2/1940 | Scholtes | 72/75 |
| 2,375,235 | 5/1945 | Maxwell | 72/123 |
| 2,377,406 | 6/1945 | Dedrick | 72/75 |
| 2,526,932 | 10/1950 | Champion | 72/75 |
| 2,657,733 | 11/1953 | Champion | 72/75 |
| 3,176,492 | 4/1965 | Francus | 72/75 |
| 3,339,388 | 9/1967 | Cann | 72/75 |
| 3,411,527 | 11/1968 | Nielsen | 72/71 |

Primary Examiner—Charles W. Lanham
Assistant Examiner—Gene P. Crosby
Attorney—Waters, Roditi, Schwartz & Nissen

[57] ABSTRACT

An apparatus adapted to form a collar round an opening in the wall of a tube or in a metal sheet or to expand the end of a tube. A screw engages a nut provided with a recess to allow the setting of the nut over the open section in which the collar is to be raised. The screw is positioned so as to engage the opening and to carry on the inside of the part to be formed balls or like members so that the outward drawing of the screw urges balls against the edge of the opening so as to engage them against the nut and to form thus the desired collar. The introduction of the balls inside the part to be formed is allowed by a piston sliding inside the screw which controls their outward projection. The piston may be replaced by a cage slidably carried over the outer surface of the screw for defining the collapsed and projecting locations of the balls.

26 Claims, 32 Drawing Figures

APPARATUS ADAPTED TO FORM COLLARS AROUND OPENINGS PREVIOUSLY EXECUTED IN PLATES OR TUBES

My invention has for its object an apparatus adapted to form collars on tubes or plates round previously executed openings. Such collars are applicable for various purposes. Generally speaking their interest consists in furthering the insertion that is the welding of a pipe or tube onto another tube of a larger diameter or onto a plate so as to provide a connection with such a plate or tube.

The apparatus according to my invention comprises chiefly a screw with a large controlling head or equivalent means through which said screw may be handled, said screw being provided along its axis with a blind bore the closed end of said bore enclosing at the lower end thereof thrust-exerting means of which each may progress radially and outwardly with reference to the lower end of the screw without any possibility of escaping, said thrust-exerting means being adapted to collapse within the end of the screw. A piston sliding axially inside the screw or the like means is adapted to urge said thrust-exerting means or else allows them to move inwardly towards each other while a nut cooperating with the thread on the screw may engage in a permanent and steady manner the tube or metal sheet round the collar to be formed on the latter so that an angular shifting of the screw in the desired direction produces an axial shifting thereof and causes the collar to be formed by the outwardly projecting thrust-exerting means.

According to a modified embodiment, the screw is not bored and its lower expanded end forms directly or through an inserted part a shaped piston while the lower end of the screw is adapted to slide inside the cage housing and holding in position balls or the like thrust-exerting means which may be urged outwardly or collapsed according to the relative axial position of the piston and of the cage. The screw cooperates with a nut bearing against the part which is to be provided with a collar whereas means ensure an angular and axial shifting of the screw and of the piston which leads to the rotation of the balls rolling over said piston serving as a bearing for them.

According to a further embodiment the end of the screw which is to pass through the tube or the metal sheet carries directly or as an insert a cutter or the like tool adapted to perforate the tube or the metal sheet so as to allow the end of the screw to actually pass through the latter before the collar is actually formed.

According to a further embodiment, the arrangement is applied directly or in association with several tiers or balls at the end of the screw so as to form a sleeve adapted to engage the part to be worked for diametrical expansion at the ends of tubes.

According to a still further embodiment there is provided an apparatus providing in succession a perforation in the tube, the formation of the collar by means of thrust-exerting means and after release of the cutting tool which has cut the tube the removal of the blank thus cut out outside the tube to be shaped. Further arrangements may be provided for the assembly of the apparatus on a bench with a view to its permanent fitting.

In order to define the object of the invention the accompanying drawings illustrate various embodiments of the latter by way of exemplification only. In said drawings.

I will now describe in a more precise manner the embodiments illustrated by way of example.

Figure 1:
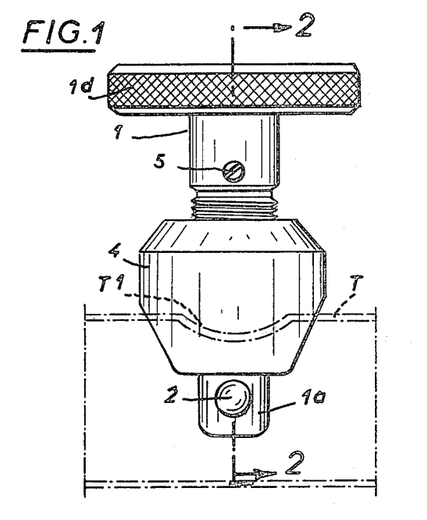
FIG. 1 is an elevational view of an embodiment carried by a tube drawn in dot and dash lines.
Figure 2:
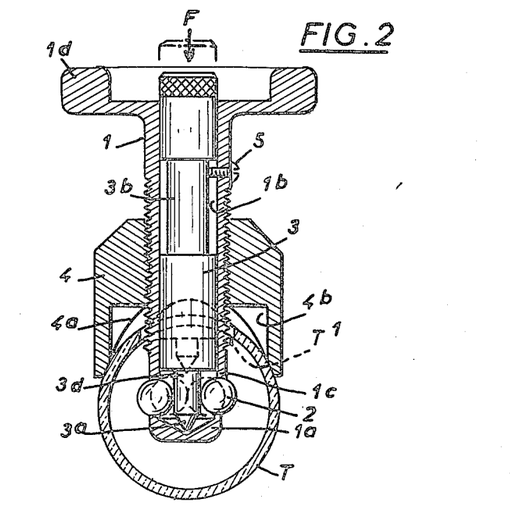
FIG. 2 is an axial cross-section through line 2—2 of FIG. 1, the lower end of the screw engaging an opening formed inside the tube and the thrust-exerting means being urged outwardly so as to project radially out of the screw while interrupted lines show the thrust-exerting means when collapsed within the lower end of the screw.
Figure 3:
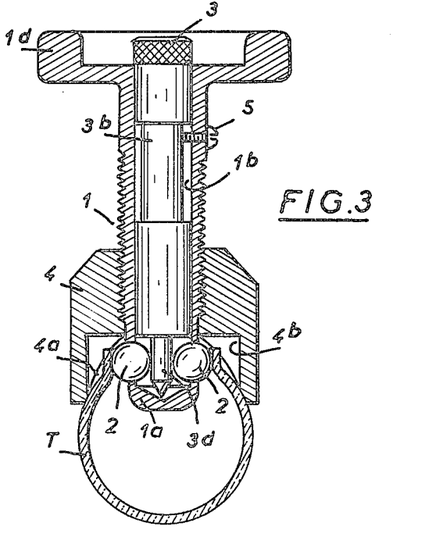
FIG. 3 is a view similar to FIG. 2 after actuation of the screw at the end of the extrusion of the collar.

In FIGS. 1 to 3 the apparatus includes chiefly a screw 1, thrust-exerting members constituted by the two balls 2 and a piston 3 provided for urging outwardly and radially the balls and which allows them to return inwardly towards each other.

The nut 4 is screwed over the screw 1 which is threaded throughout the major part of its length. The lower end of the screw is provided with a smooth bearing 1a. A blind bore 1b extends throughout the major part of the length of the screw and of the bearing end 1a of the latter, the bore being closed in the immediate proximity of the outer surface of said lower end. The thrust-exerting means are housed inside the blind bore 1b within the bearing end 1a.

In the example illustrated and according to an advantageous and economical feature of my invention, the thrust-exerting means are constituted by balls 2 exerting a perfectly gradual pressure without any risk of damaging a metal surface or of initiating cracks. The balls 2 are furthermore economical articles.

There are two balls in the example illustrated, but their number is not limited and depends on the diameter of the screw and of the collars to be obtained. There may consequently be more than two balls or even only one.

There are also radial openings 1c starting from the blind bore 1b and extending inside the bearing end 1a, said openings 1c being preferably arranged in a uniform angularly spaced relationship their number corresponding to the number of balls. The diameters of the radial openings 1c are chosen so as to allow them to provide a partial passage for the balls 2 when projecting beyond the outer surface of the bearing end 1a.

However the balls are held within the bearing end 1a by reason of their diameter being larger than the diameter of the openings 1c. The balls may also be held within said bearing end by a crimping of the edges of the openings 1c. The whole arrangement is designed so that the balls may be collapsed completely within said bearing end 1a.

It is also possible to resort to other thrust-exerting means adapted to slide and collapse within corresponding openings in the screw while their outwardly projecting ends assume the shape of spherical caps or of suitably incurved surfaces. Such parts may be urged inwardly of the bearing end 1a by springs.

Inside the axial blind bore 1b of the screw there may slide a piston 3, the lower conical end 3a of which is adapted to urge the balls outwardly of the bearing end 1a. Whenever the piston is urged forwardly of the screw in the direction of the arrow F(FIG. 2) the balls are held in their projecting position through engagement by the piston end 3d When in contradistinction the piston is drawn out, the balls 2 may be collapsed and return inside the bearing end 1a.

Arresting means such as a screw 5 are adapted to hold the piston at the end of its movement inside the screw 1 and for this purpose the end of the screw 5 projects into said bore 1b and engages a section 3b of a reduced diameter of the piston. A sufficient path is thus allowed for the stroke of the sliding piston.

The screw 1 is provided with a very broad head 1b which may be milled or corrugated along its periphery so that it is possible to take hold of it readily for operation. Other screw-controlling means may be resorted to. For instance the head or another part of the screw may be provided with peripheral radial holes adapted to be engaged by a control rod 6 drawn in dot and dash lines in FIG. 2.

Figure 4:
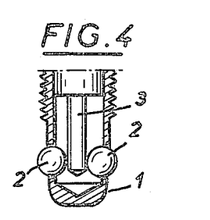
FIG. 4 is an axial cross-section of the lower end of the screw showing the shape of the piston adapted to urge the balls outwardly, the diameter of the screw being comparatively small.
Figure 5:
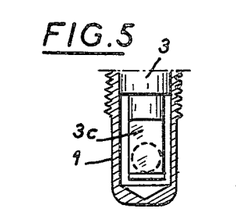
FIG. 5 is a side view corresponding to FIG. 4.
Figure 6:
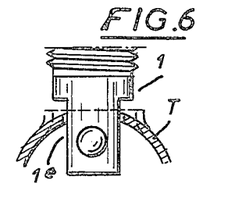
FIGS. 6 to 8 are corresponding elevational, lateral and plan views of another embodiment of the end of the screw, said embodiment being intended for the formation of circular collars round oval or other non-circular openings.

When the diameter of the bearing end 1a is small, only two balls are used and the end of the piston 3 is provided as illustrated in FIGS. 4 and 5 with flat longitudinal parallel surfaces 3c.

The nut 4 cooperates with the thread on the screw. By way of example there may be provided a left-hand pitch for the screw so that upon clockwise actuation of the latter which corresponds to an easier manual operation there is obtained a relative shifting urging the bearing end 1a of the screw in a direction corresponding to the formation of the collar.

The nut 4 is provided with a broad V-shaped recess 4a which ensures its proper centering and positioning over the transversely extending tube T. An inner chamber 4b forms the clearance required for the complete extrusion of the collars by the balls.

The operation of the apparatus should be clear upon reading of the following description and inspection of the drawings chiefly of FIGS. 2 and 3.

An opening T1 is formed first in the wall of the tube T by drilling or otherwise. The size of said opening is such that the bearing end 1a may pass through it while the balls 2 are urged back into said bearing end as illustrated in interrupted lines in FIG. 2, the nut 4 engaging the tube T through its V-shaped recess 4a. Upon actuation of the piston 3, the balls are urged then radially outwardly out of the bearing end 1a(FIG. 2) while remaining in contact with the bearing surface 3d at the end of the piston.

The screw is then caused to turn in a direction which draws the bearing end 1a with the balls out of the tube T. During said movement the balls engage gradually the edge of the opening T1 in the tube. Said edge is thus extruded gradually and uniformly as illustrated in FIG. 3 while the collar produced retains the thickness of the tube without any weakening of the metal which is not injured and consequently no crack is initiated. The balls roll over the extruded metal which ensures a very smooth operation.

Figure 7:
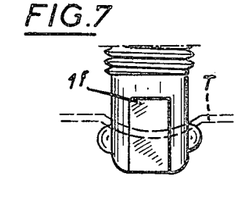
Figure 8:
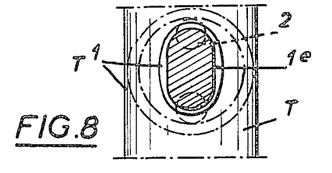
Figure 9:
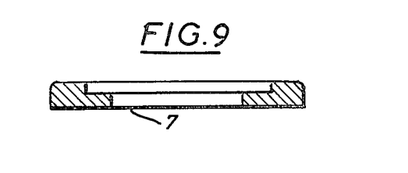
FIG. 9 illustrates a washer adapted to be fitted over the lower end of the nut of the apparatus when it is desired to form collars in flat metal sheets.
Figure 10:
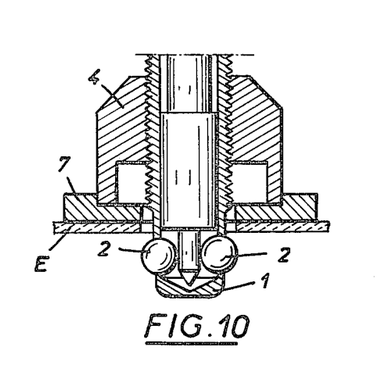
FIG. 10 is an axial cross-section of the apparatus including such a washer before the formation of the collar.

It is not necessary for the opening T1 to assume a circular shape since it may be obtained through other means such as filing. The opening T1 may in fact be oval as illustrated in FIG. 8 instead of being circular. Such a shape leads to the formation of a collar the edge of which lies in one same plane or substantially so and this is of particular interest when large-sized collars are required, the outer edges of which are corrugated by the geometrical result of their shaping and deformation. The tubes fitting such collars are fitted therein to an uneven extent. In such a case the lower bearing end of the screw may be given a transverse cross-section of an elongated shape as provided by the formation of lateral transverse surfaces 1f along the sides of the bearing end 1a or in any other suitable manner (FIGS. 7 and 8). The arrangement disclosed provides for the production of collars also on flat metal sheets. It is sufficient for said purpose to fit a washer 7 (FIG. 9) over the lower end of the nut 4. The latter bears thus permanently in a stable manner over the flat plane formed by the metal sheet E in which a collar is to be formed (FIG. 10) the procedure continuing thenafter as described for the tube so as to form the actual collar. Such an application increases substantially the field of the invention.

It is also possible to produce on a tube collars extending obliquely with reference to the axis of the tube by resorting to the apparatus disclosed. In such a case the nut is cut obliquely along a V-shaped dihedral corresponding to the angle desired for the collars. However the balls or other thrust-exerting parts act in alternation on the tube or on the metal sheet by reason of the slope given to the screw. The extruding stress exerted on the metal is no longer symmetrical and balanced and consequently it is necessary to provide a larger bearing area for the nut 8(FIGS. 11 and 12), said nut being provided for this purpose with extensions 8a and 8b.

Figure 11:
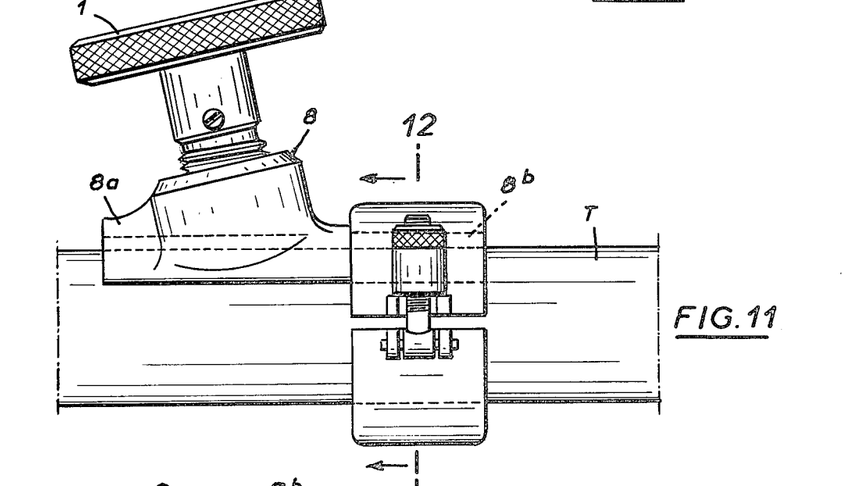
FIG. 11 illustrates a modification adapted to form collars which are oblique with reference to the tube axis.
Figure 12:
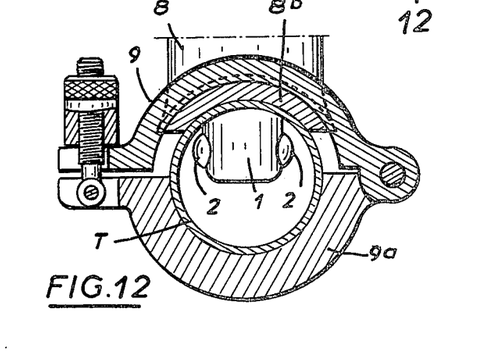
FIG. 12 is a cross-section through line 12—12 of FIG. 11.
Figure 13:
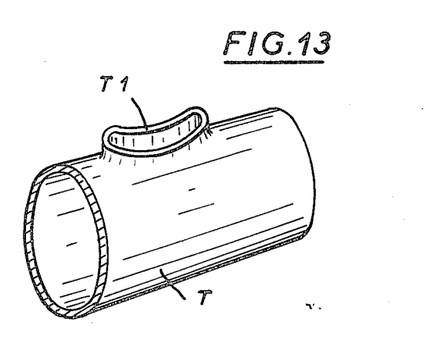
FIG. 13 illustrates a collar formed on a tube.

The nut and apparatus are held fast over the tube during the formation of the collar for instance by means of an auxiliary collar made of two sections 9 and 9a pivotally secured to each other and adapted to be locked together. One of said sections 9a has a larger thickness so as to compensate for the thickness of the extension 8b of the nut.

Instead of an auxiliary collar I may resort to any clamping system or else to a movable jaw system for the transient securing of the apparatus operating obliquely on the tube or metal sheet.

Figures 14, 15:
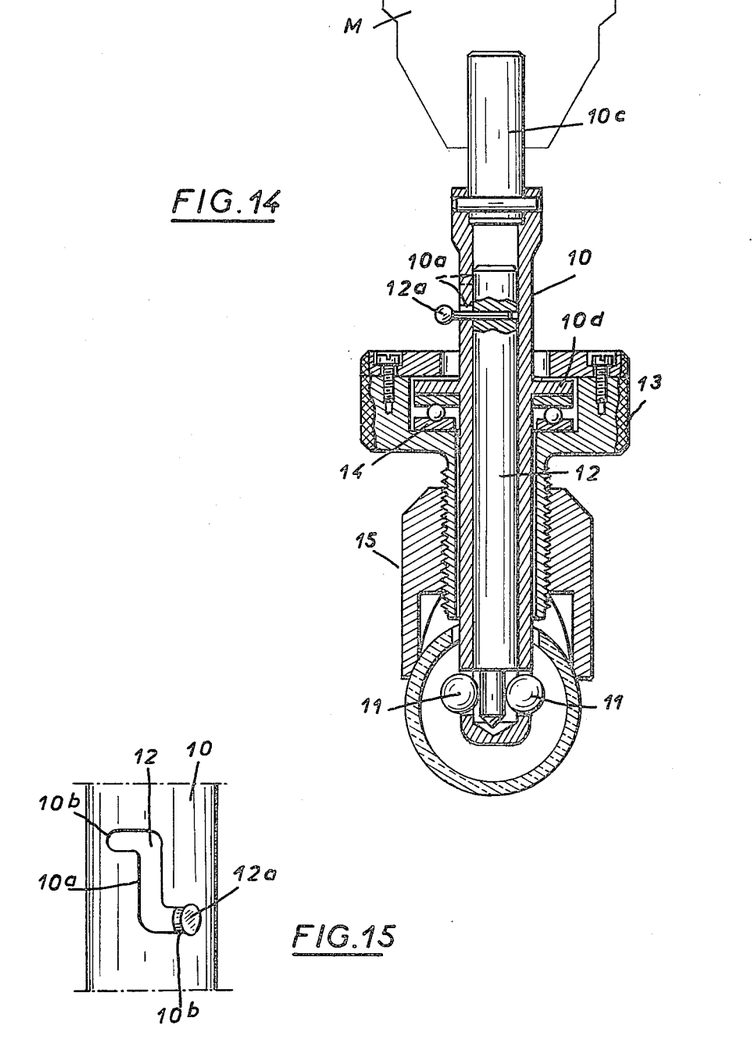
FIG. 14 illustrates diagrammatically an embodiment adapted to angularly shift the balls or the like thrust-exerting members by means of a drilling machine, the axial shifting being obtained by hand.
FIG. 15 is a side view of a detail of the arrangement illustrated in FIG. 14.

FIG. 14 illustrates a particular arrangement which is of interest whenever a large number of collars are to be obtained or else whenever the metal forming the tube or the metal sheet shows properties which make its extrusion by hand more difficult. In the case now considered, the upright 10 is bored axially in the manner disclosed precedingly for the screw 1. The lower end of said upright carries balls 11 or the like thrust-exerting parts.

A piston 12 may be shifted by a lever 12a inside the axial bore of the upright 10 which latter is provided for this purpose with a short longitudinal slot 10a terminating with transverse notches 10b (FIG. 15) engaged selectively by the lever 12a rigid with the piston. The balls are thus held in their outwardly projecting position when the lever is in its lowermost position or else in their inner position when the lever is in its uppermost position.

The upper end of the upright 10 is rigid with or carries as an insert a tail-piece 10c which may be fitted within the jaws of the mandrel M of a boring machine.

At a point of the length of the upright 2 there is provided an outer flange 10d between which and a bored screw 13 surrounding the upright there is fitted a ball bearing 14. The screw 13 can rotate freely with a sufficient clearance round the upright 10 and its thread cooperates with a nut 15 of the type already disclosed.

It will be readily understood that the drilling machine drives at a suitable angular speed the upright 10 and the ball or the like thrust-exerting parts. The axial shifting of the upright 10 and of the balls is provided on the other hand by actuating the screw 13 with a view to producing the desired extrusion. Otherwise the apparatus operates in the manner already disclosed.

Figure 16:
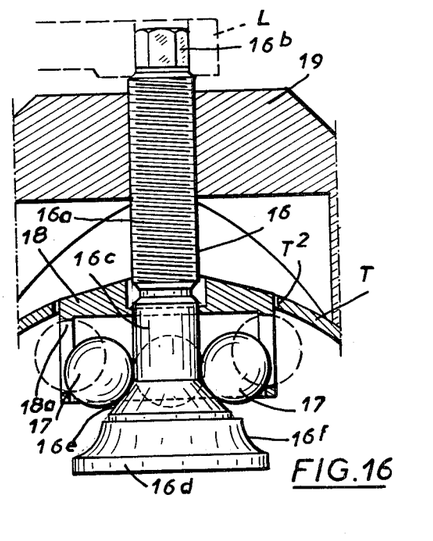
FIG. 16 is a view of a modification adapted to form collars on tubes or plates made of steel or the like hard metal the apparatus being positioned and fitted partly inside an opening in the tube.
Figure 17:
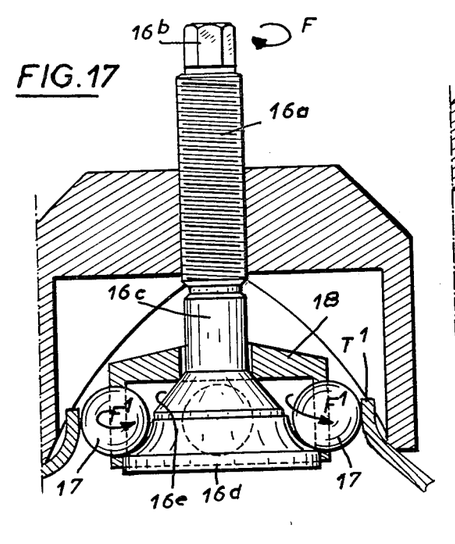
FIG. 17 is a view similar to FIG. 16 showing the arrangement at the end of the formation of the collar.

As apparent from inspection of FIGS. 16 and 17 illustrating a modification there is shown a screw 16 which is no longer bored axially and is threaded at 16a along the major part of its length.

The outer end of said screw forming a six-sided head 16b or the like carries a lever L drawn in interrupted lines and acting through a catch or otherwise on said head 16b The inner end of the screw 16 forms a smooth bearing 16c terminating as a piston rod 16d. In the example illustrated said piston 16d is integral with the end of the screw. Of course it is possible to resort as well to a piston constituted by an insert.

The piston 16d merges into a frusto-conical bearing surface 16e followed by an arcuate bearing surface 16f the radius or cross-section of which matches that of the balls 17. Said balls the number of which depends in particular on the diameter of the collar to be formed are held within a cage 18 adapted to slide along the screw.

The cage 18 may surround the piston 16 (FIG. 17). For the axial position of the piston illustrated in FIG. 17 the balls 17 engage the bearing surface 16f and project substantially beyond the periphery of the cage. Of course the cage 18 is provided with radial openings 18a through which the balls may project, said openings being however crimped along their edges so as to hold the balls inside the cage by reason of their maximum diameter preventing their dropping out or else the openings 18a may be given a slightly smaller diameter.

When the cage 18 is shifted along the screw away from the piston (FIG. 16), the balls 17 collapse within the cage and engage the bearing surface 16e to come nearer the smooth cylindrical bearing surface 16c. Recesses formed in lastmentioned bearing surface 16c allow the balls 17 to move to a maximum extent towards one another.

A suitable ratio between the ball diameters and the radii of the cage and of the bearing surface 16c allows the balls 17 to engage permanently the openings 18a that is the balls remain in registry with said openings and are ready to be urged outwardly through them. A centering carrier nut illustrated by way of example at 19 cooperates with the threaded stem 16a of the screw in the manner already disclosed.

The operation appears clearly from inspection of FIGS. 16 and 17, said operation being intended for the formation of a collar T1 on the tube T. When the opening T2 has been obtained, the cage 18 is inserted with the balls 17 and the piston 16d inside the tube through said opening T2, the balls being collapsed within the cage as illustrated in FIG. 16.

An axial shifting of the piston, through the agency of the nut 19, for instance, away from the tube, urges the balls 17 outwardly as shown by the interrupted lines in FIG. 16. Upon continuation of an axial shifting of the screw 16a and of the piston (FIG. 17) as provided by an angular shifting in the direction of the arrow F, the nut 19 engages the tube T and forms the collar in the manner illustrated in FIG. 17 at T1. The arrangement makes it possible to form collars on tubes and plates made of a hard metal chiefly of steel, this being obtained by the driving of the balls into rotation round their axes as illustrated by the arrows F1. Said rotation is given to the balls while they are caused to pass through the tube or metal sheet. This constitutes a manual control leading to a highly gradual and powerful action.

Of course the apparatus may as well form collars on sheets and plates of a hard metal or the like material as disclosed hereinabove.

Within the ambit of said embodiment, it is possible to equip the end of the screw with a milling cutter or the like cutting tool adapted to drill the opening to be executed before the formation of the collar.

Figure 22:
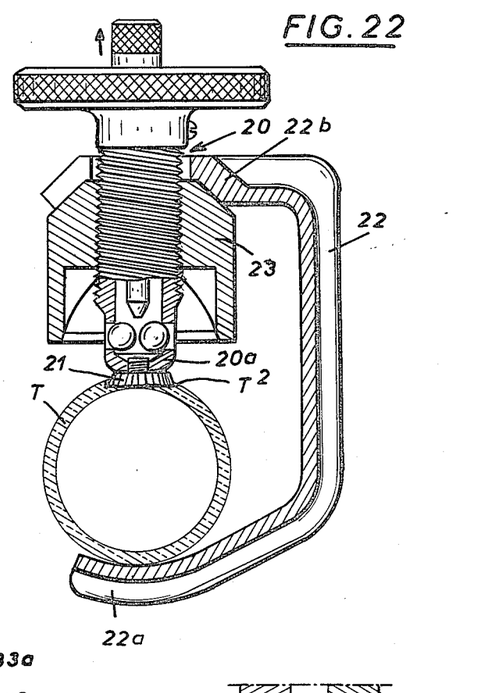
FIG. 22 shows an apparatus associated with a retaining strap while the end of the screw is designed for direct perforation of a tube or possibly of a metal sheet.

FIG. 22 illustrates an embodiment in which the end 20a of the screw 20 carries a milling cutter 21. Upon angular shifting of the screw in the desired direction with reference to the cutting edge of the cutter, the hole T2 is drilled whereupon the end 20a of the screw can enter the tube T.

For sake of an easy operation and when it is necessary to exert a substantial effort a strap 22 is used of which one arm 22a forms a bearing for the tube T while the other arm 22b of said strap engaging the nut 23 is slotted so that it may extend to either side of the screw. This provides a complete and autonomous system for the execution of collar-forming operations.

Various driving means may be proposed for driving the screw and/or the axially sliding piston as illustrated in FIGS. 18 to 21.

Figure 18:
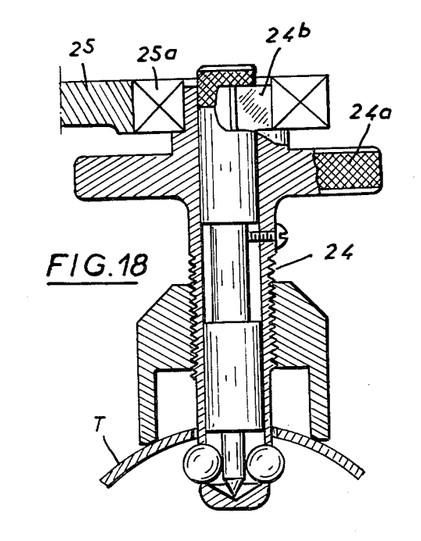
FIGS. 18 to 21 illustrate means for angularly shifting the screw and the piston.

In FIG. 18, the screw 24 carries a handwheel 24a or else a milled or notched head controlling said screw. The latter extends beyond said handwheel or head to form a square driving member 24 b adapted to cooperate with a catch-actuating lever 25. The catch system is of any known type and is illustrated symbolically at 25a. The effort is thus multiplied so that it is possible to operate more easily in certain cases, say in the corners of buildings.

Figure 19:
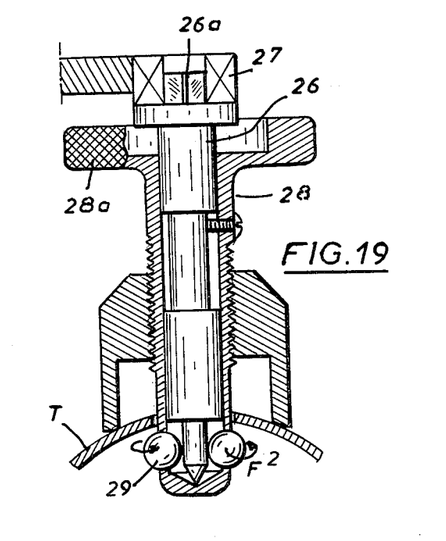

In FIG. 19 the free end of the piston 26 is provided with a square end 26a or the like polygonal driving end controlled by a catch-actuating wrench or lever 27. Thus, simultaneously with the angular driving of the screw 28 by the handwheel 28a, it is possible to bestow the piston with a rotary shifting which causes the balls 29 to revolve round their center as illustrated by the arrows F2. This ensures a more gradual and more powerful stress which is of particular interest in the case of the formation of collars on tubes or plates of a hard metal such as steel.

Figure 21:
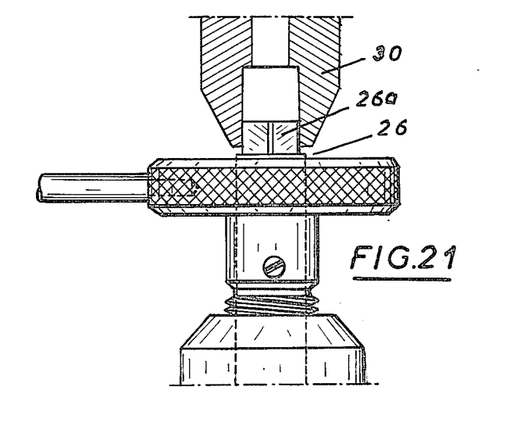

Similarly, FIG. 21 shows how the piston 26 may be driven by the square end 26a or the like polygonal extension through the agency of a connecting member 30 controlled by a machine.

Figure 20:
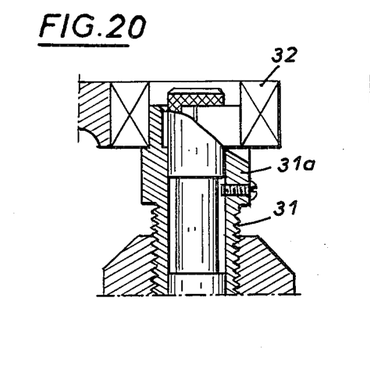

In FIG. 20, the screw 31 includes no handwheel or hand operated driving handle and its end includes a bearing member 31a of a polygonal or square shape adapted to cooperate with a simple or catch-actuated wrench or lever 32.

Figure 23:
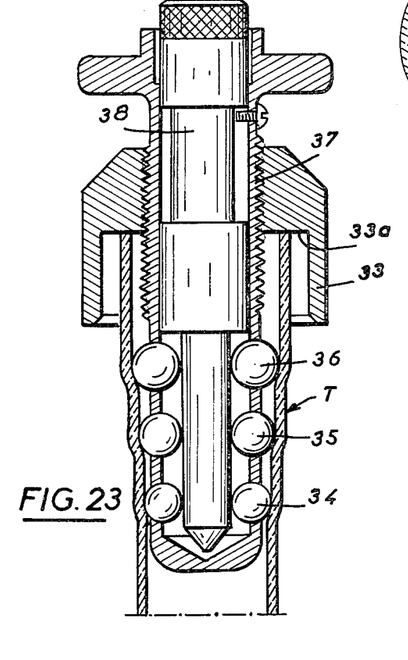
FIG. 23 illustrates a modification of the apparatus adapted to form through expansion a sleeve at the end of a tube.

An interesting application of the invention illustrated in FIG. 23 is adapted to form through expansion a sleeve at the end of a tube.

In this case the bottom of the recess 33a formed in the nut 33 bears against the end or terminal edge of the tube T. If the expansion is of a reduced extent it is possible, taking into account the hardness of the metal forming the tube, to resort to a screw associated with balls. However, in order to ensure a sufficient expansion a gradual radial deforming action is required. There are then provided several tiers or levels of balls, say three in the example illustrated as shown at 34,35,36. Of course, the ends of the screw 37 and of the axial piston 38 are given corresponding lengths.

The diameters of the balls increase from one level to the next starting from the outer end of the apparatus or else the ball-engaging sections at the lower end of the piston show increasing diameters. Consequently the balls surrounding the end of the screw 37 project by increasing amounts from one level to the next. Therefore , the expansion obtained is a gradual one. The nut 33 or the bearing means replacing the latter may be urged under pressure against the end of the tube T through any suitable means.

This is obviously of interest since it is possible to thus connect axially alined tubes by engaging their cooperating ends one within the other after which they are soldered together, which is a speedier and safer manner of operating then the welding together of two tubes endwise and the appearance obtained is far better.

In the modification illustrated in FIGS. 24 to 32 the apparatus includes a U-shaped carrier strap 39 one of the upwardly bent arms of which forms a stationary jaw showing a centering notch 39[1] which is striated so as to engage and hold the tube T. The opposite upwardly bent arm of the carrier strap 39 is transversely bored and its bore carries the freely revolvable section $40^1$ of the controlling nut 40. The latter includes a peripherally striated cylindrical head provided with blind radial holes $40^2$ adapted to be engaged when required by driving pins. Said nut 40 is held fast longitudinally through the agency of an arresting ring 41 screwed over the end of the bearing section $40^1$ While its inner surface shows an annular groove engaged by the balls 42 engaging also the side of the arm of the carrier strap opposed to the head of the nut. A locking screw 43 passes through the ring 41 so as to secure it when it has been adjusted in position in contact with the balls 42. Said arrangement forms a ball bearing furthering the rotation of the nut 40 when a clamping stress is to be exerted.

Figure 24:
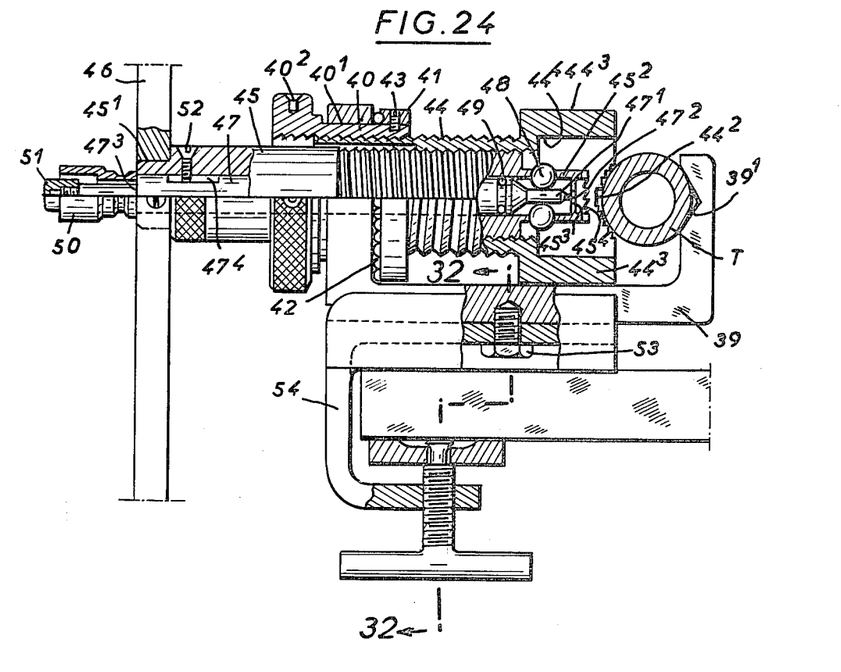
FIG. 24 is a front view partly sectional of a modification when the apparatus is set on a bench support, the axial piston being illustrated in an intermediate position.

The nut 40 is bored and threaded so as to be screwed over the corresponding cylindrical section of the movable jaw 44, the shouldered end $44^1$ of the latter being provided with a centering and bearing notch $44^2$ and with opposite parallel flat surfaces $44^3$. The lower flat surface $44^3$ cooperates with the central section of the carrier strap 39 so as to allow a free longitudinal sliding and guiding of the movable jaw 44 over it during the rotation of the nut 40. Said arrangement leads to the constitution of a clamping strap for the tube T or for the plate or sheet to be shaped.

The movable jaw 44 is provided with an inner chamber $44^4$ and with a tapped bore adapted to be engaged by the tool-carrying screw 45, the outer projecting end of which is partly milled and includes a polygonal section $45^1$ adapted to cooperate with a driving wrench or lever 46. At its opposite end the screw 45 is shouldered and forms an axial cylindrical projection $45^2$ the end of which is cut along its transverse surface so as to form the cutting tool. A cylindrical chamber $45^3$ extending coaxially within the toothed tool $45^4$ engages and holds in position the blank cut out of the tube during the boring operation as disclosed hereinafter.

Obviously said cutting tool may be set on the projection $45^2$ so as to be readily interchangeable and replaced by other tools of different shapes and sizes. The screw 45 carries inside it a freely sliding axial piston 47 the end of which includes in succession a flat section $47^1$ and at the end thereof an extracting rod $47^2$ entering the chamber $45^3$.

As disclosed for the preceding embodiments, the flat sections $47^1$ cooperates when required with the thrust-exerting means constituted by two or more balls 48 passing through openings in the projection $45^2$ so as to allow their desired projection and collapse.

An expansible washer 49 of the circlips type housed within the groove of the piston 47 acts frictionally within the corresponding bore in the screw 45 so as to ensure a permanent braking of the latter.

The piston 47 projects outwardly of the screw 45 and terminates with a rear shouldered section $47^3$ so as to allow the free sliding over it of an abutment-forming knob 50 held fast by a nut 51.

It should be remarked that said knob 50 is provided at the rear with a diameter which is sufficient for it to engage during its shifting the extreme transverse surface of the screw 45 on the outside of the piston shoulder $47^3$.

Figure 25:
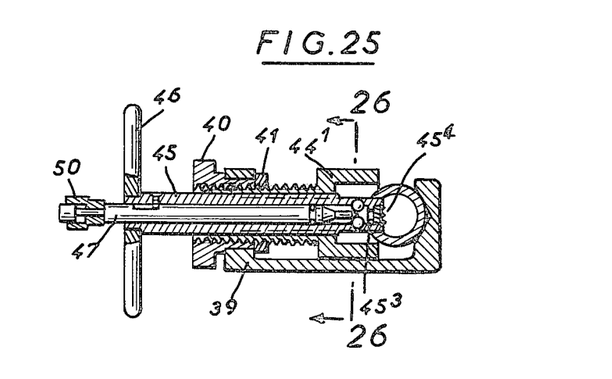
FIG. 25 is a sectional view of the apparatus considered alone during the perforation of a tube secured between jaws.
Figure 26:
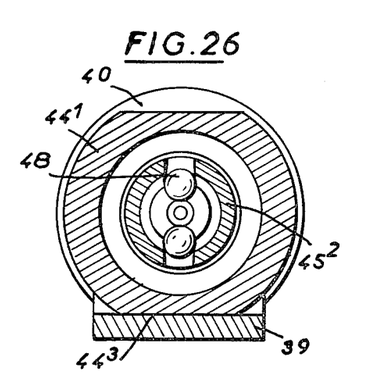
FIG. 26 is on a larger scale a transverse cross-section along line 26—26 of FIG. 25.

According to said arrangement, the tube T being clamped between the jaws $39^1$ and 44, the screw 45 locates the toothed tool $45^4$ on the cylindrical projection $45^2$ inside the chamber $44^4$ of the jaw 44. The piston 47 is drawn out to a maximum extent through the agency of the knob 50 so as to allow the collapse of the balls 48 within the projecting section $45^2$ of the screw.

As illustrated in FIG. 25, the rotary stress exerted on the lever 46 driving the screw produces during the progression of the tool-carrying screw 45 the cutting of the tube T by the teeth $45^4$ whereby a blank P is cut out which enters gradually with a force fit within the chamber $45^3$.

Figures 27, 28:
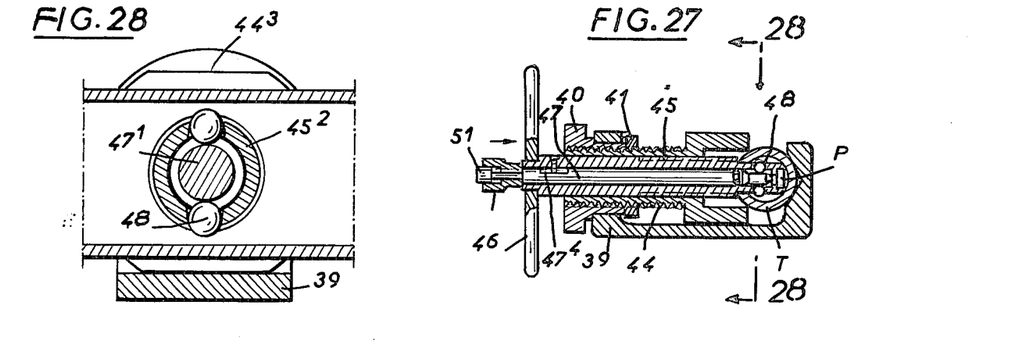
FIG. 27 is a view similar to FIG. 25 but corresponds to a stage following the perforation of the tube and the positioning of the piston with a view to projecting outwardly the thrust-exerting means within said tube.
FIG. 28 is a transverse cross-section on a larger scale through line 28—28 of FIG. 27.
Figures 29, 30:
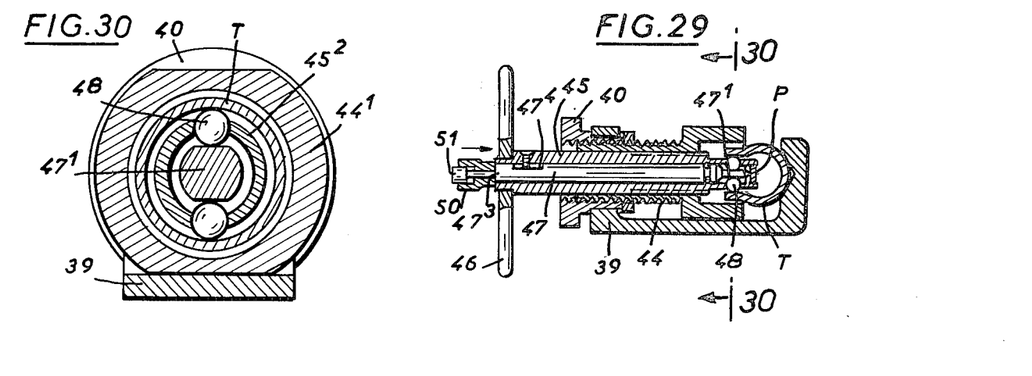
FIG. 29 is a view similar to FIG. 25 corresponding to the stage forming the collar.
FIG. 30 is a cross-section on a larger scale through line 30—30 of FIG. 29.

After drilling the opening in the tube, the tool-carrying screw 45 which remains in its forward position corresponding to the abutment of the shoulder on the cylindrical projection $45^2$ as illustrated in FIG. 27, the knob 50 is urged manually in the direction of the arrow of FIG. 27. During its shifting said knob 50 cooperates with the shouldered section $47^3$ of the piston 47 which is thus urged forwardly so as to allow the flat section $47^1$ of the latter to engage the interval between the balls 47 and to ensure their projection into engagement with the inside of the tube T. It should be remarked that such a shifting of the piston 47 is advantageously limited by the bearing of the rear surface of the knob 50 against the extreme transverse surface of the screw 25 so as to cut out any engagement of the extracting rod $47^2$ inside the chamber $45^3$ carrying the blank P. This prevents the releasing and dropping out of the latter into the tube T. The formation of the collar is obtained through a reverse rotation of the tool-carrying screw 45 so as to allow the balls 47 to act through extrusion as illustrated in FIG. 29.

Figure 31:
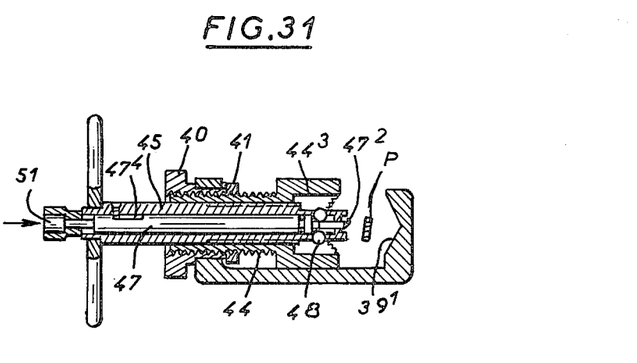
FIG. 31 is a sectional view of the apparatus after releasing of the tube showing said apparatus during the removal of the blank cut out of the metal sheet and previously confined within the cutting tool.
Figure 32:
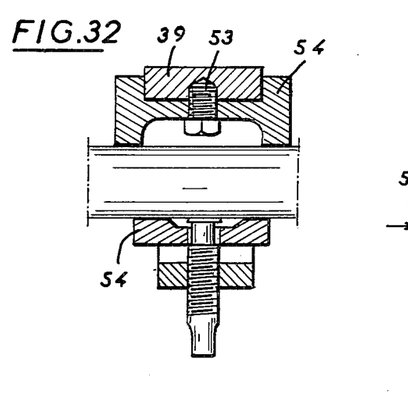
FIG. 32 is a partial sectional view through line 32—32 of FIG. 24.

At the end of the operation when the collar is finally obtained and the tube T is removed out of the jaw $39^1$ and 44, the thrust exerted on the projecting end of the piston 47 in the direction of the arrow of FIG. 31 ensures a further shifting of said piston independently of the knob 50 so as to make the rod $47^2$ push the blank P out of the apparatus.

It should also be remarked that the extreme positions of the piston 47 are limited by a screw 52 passing through the tool-carrying screw 45 so that its end engages the flat recess $47^4$ in the piston 47.

The apparatus disclosed may be fitted through its carrier strap 39 over the U-shaped section of a bench support 54 and it may be secured thereto by the screws 53 or otherwise, the support 54 being of a conventional type.

It should also be observed that the tool-carrying screw 45 is interchangeable which allows producing collars of various diameters. Lastly it should be remarked that said tool-carrying screw 45 may be arranged angularly with reference to the axis of the tube T so as to allow oblique collars to be executed as already disclosed.

What I claim is:

1. An apparatus adapted to form collars around openings in a part forming the wall surface of a tube or a flat member, said apparatus comprising a screw including control means and thrust-exerting means adapted to be shifted radially and outwardly of the lower end of the screw, a member sliding axially with reference to the screw and engaging said thrust-exerting means to control their shifting and a nut threaded over the screw and adapted to engage in a rigid clamping manner the part on which the collar is to be formed around the location of the latter whereby angularly rotating the screw in the desired direction produces a relative axial shifting of the outwardly projecting thrust-exerting means with reference to the nut.

2. An apparatus adapted to form collars around openings in a part forming the wall surface of a tube or a flat member, said apparatus comprising a screw including control means and provided with a blind axial bore the lower closed end of which communicates with the outside through radial openings, thrust exerting balls adapted to be shifted radially and outwardly of the lower end of the screw, a piston sliding axially with reference to the screw and engaging said balls to control their shifting and a nut threaded over the screw and adapted to engage in a rigid clamping manner the part on which the collar is to be formed around the location of the latter whereby an angular shifting of the screw in the desired direction produces a relative shifting of the outwardly projecting ball with reference to the nut.

3. An apparatus as claimed in claim 2 wherein at least two thrust-exerting balls rest on the lower end of the bore in the screw and register with said radial openings through which said balls are adapted to project outwardly without escaping.

4. An apparatus as claimed in claim 2 wherein the lower end of the sliding piston is generally conical and includes a cylindrical bearing surface for the balls.

5. An apparatus as claimed in claim 2 wherein the lower end of the sliding piston is provided with flat parallel longitudinal surfaces forming bearing surfaces for the balls.

6. An apparatus as claimed in claim 2 wherein arresting means hold the piston sliding over a predetermined path against outward movement inside the screw.

7. An apparatus as claimed in claim 1 wherein the screw includes a head which is provided with openings for engagement by removable driving members.

8. An apparatus as claimed in claim 1 wherein the nut cooperates with the screw through a left-handed thread and is provided with a broad V-shaped notch and with an inner clearance chamber.

9. An apparatus as claimed in claim 1 wherein the lower end of the screw is elongated.

10. An apparatus as claimed in claim 1 for operation of on a flat part including a washer removably fitted over the nut for improvement of the engagement between said nut and the flat part.

11. An apparatus as claimed in claim 1 wherein in order to produce oblique collars, the nut is cut off obliquely and includes extensions seating the apparatus on the part on which a collar is to be formed, the apparatus including means adapted to secure said nut on said part.

12. An apparatus as claimed in claim 1 associated with a drilling machine, the apparatus including an axial upright fitted inside the screw and carrying in its stead the thrust-exerting means and sliding member, the upper end of said upright being adapted to be driven by the mandrel of the drilling machine.

13. An apparatus as claimed in claim 1 wherein the screw includes at its lower end a shaped piston and carries outwardly the sliding member constituted by a cage provided with radial openings and inside which the thrust-exerting means are housed so as to be urged outwardly and collapsed within the cage according to the relative axial position of the piston-carrying screw and of the cage, said thrust-exerting means comprising a plurality of balls, means being provided for driving angularly and axially the screw and piston to constrain the balls to revolve and roll over the surface of the piston.

14. An apparatus as claimed in claim 13 wherein the piston is provided with a bearing surface furthering the outward shifting of the thrust-exerting means and a further bearing surface having an arcuate cross-section and adapted to be engaged by said thrust-exerting means when projecting outwardly.

15. An apparatus as claimed in claim 13 wherein the thrust-exerting means engage partly the radial openings in the cage even when in their collapsed position.

16. An apparatus as claimed in claim 1 chiefly for use with tubes wherein the end of the screw extending through the part to be provided with a collar carries a cutting tool adapted to cut through said part to allow the end of the screw to pass through the opening thus obtained before the formation of the collar.

17. An apparatus as claimed in claim 1 chiefly for use with tubes wherein the end of the screw extending through the part to be provided with a collar carries a cutting tool adapted to cut through said part to allow the end of the screw to pass through the opening thus obtained before the formation of the collar, the apparatus comprising furthermore a strap of which one arm forms a bearing for a tube to be cut through while the other arm forms a bearing for the nut during the cutting through of the tube.

18. An apparatus as claimed in claim 13 wherein the upper end of at least one of the components, the screw, includes means for shifting by angularly rotating said component.

19. An apparatus as claimed in claim 1 wherein the apparatus includes around the end of the screw several tiers of thrust-exerting means forming together a sleeve adapted to engage the open end of a tube and to expand the latter.

20. An apparatus as claimed in claim 19 wherein each tier of the thrust-exerting means comprises balls and shows increasing diameters for the successive tiers.

21. An apparatus as claimed in claim 1 including a carrier strap of which one arm forms a stationary jaw and the other carries the nut, said nut including a movable jaw adapted to clamp the part to be provided with a collar, a cutting tool carried by the screw screwed within the movable jaw and adapted to cut through the wall of a tube on which a collar is to be formed, said screw enclosing the thrust-exerting means controlled by the sliding member constituted by a piston projecting outwardly of the rear end of the screw, an abutment-forming knob carried by the rear end of the piston, said piston providing for the collapse of the thrust-exerting parts together with the drawing out and removal of the blank cut out by the cutting tool after formation of the collar the apparatus including furthermore a support carried by the carrier strap and ensuring the fitting of the apparatus on a bench.

22. An apparatus as claimed in claim 21 wherein the nut revolving inside the corresponding arm of the carrier strap is held longitudinally by an arresting ring showing an annular groove engaged by balls bearing against the surface of said arm, said nut being screwed over a threaded section of the movable jaw and including a head guided longitudinally by a flat surface sliding over the central arm of the carrier strap.

23. An apparatus as claimed in claim 21 wherein the screw includes a terminal cylindrical projection cut across its free end to form a cutting tool with an inner chamber adapted to receive and hold in position the blank cut out of the tube during the drilling operation while the opposite end of the screw forms a polygonal section adapted to be actuated by a wrench the screw showing radial openings through which the thrust-exerting means may collapse or project outwardly under the control of the axial piston forming the sliding member carried inside an axial bore of the screw.

24. An apparatus as claimed in claim 21 wherein the sliding member constituted by a piston carried inside an axial bore of the screw includes a flat section controlling the spacing of the thrust-exerting means and extending as an extracting rod in order to remove the blank formed by the latter, the opposite end of the piston projecting beyond the screw and forming a shouldered section on which is slidingly carried the abutment-forming knob held fast at its end by a nut.

25. An apparatus as claimed in claim 21 wherein the abutment-forming knob when shifted manually drives the piston over a predetermined path defined by its engagement with the rear end of the screw to allow the outward projection of the thrust-exerting means after the formation of a preliminary opening in the part.

26. An apparatus as claimed in claim 1 wherein the screw extends slopingly with reference to the axis of the part on which a collar is to be formed.

* * * * *